Feb. 2, 1965     D. H. HANUSIAK     3,168,641
CORDLESS TRAVEL IRON
Filed July 22, 1963
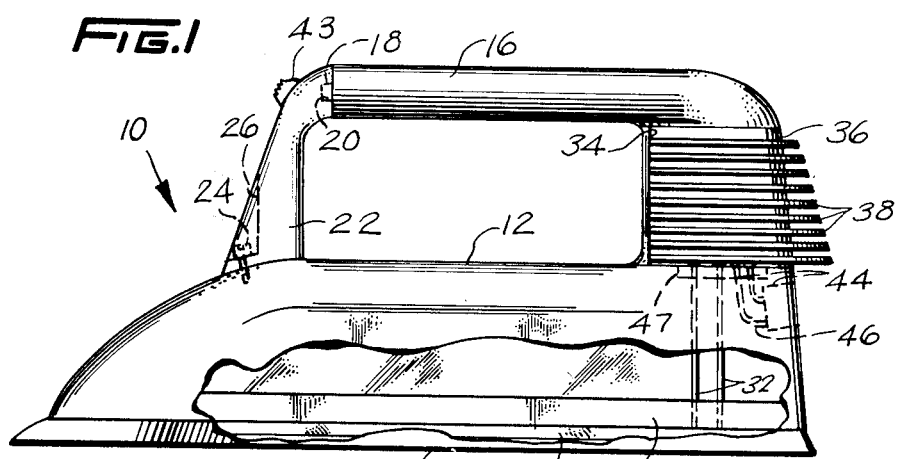
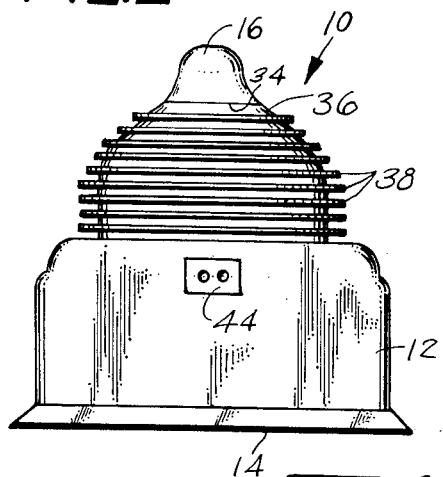
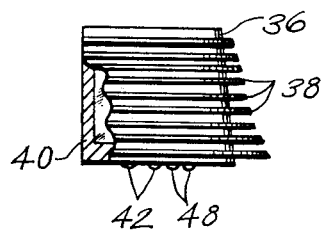
INVENTOR.

United States Patent Office 3,168,641
Patented Feb. 2, 1965

3,168,641
CORDLESS TRAVEL IRON
Dorothy H. Hanusiak, 14 High View Terrace,
Hamden, Conn.
Filed July 22, 1963, Ser. No. 296,549
1 Claim. (Cl. 219—250)

This invention relates to electric irons and more particularly to an improved travel iron.

It is a primary object of the present invention to provide a cordless travel iron which will contain a rechargeable and replaceable power supply, thus enabling the user to iron clothing in areas where there are no electrical outlets.

Another object of the present invention is to provide a travel iron which will have a rechargeable battery pack and will be versatile by having cord means for recharging the battery pack from alternating current receptacles, such as are found in buildings, homes, hotels, and motels. The device will also have rechargeable cord means providing a means for recharging the battery pack from a vehicle's electrical circuit.

A further object of the present invention is to provide a cordless travel iron which will be particularly useful to campers and other travellers, and the iron will have maximum balance for easy handling with a minimum of effort.

Other objects of the invention are to provide a cordless travel iron having the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side elevational view of the present invention shown partly broken away;

FIG. 2 is a rear end view of FIG. 1;

FIG. 3 is a side view of the rechargeable battery pack shown removed from the invention;

FIG. 4 is a plan view of the plug in cord for recharging the battery pack of the present invention.

Referring to the drawing, a cordless travel iron 10 made in accordance with the present invention is shown to include a hollow metallic shell 12 having a smooth ironing surface 14. The handle 16 is fixedly secured to shell 12 and is provided with a forward projection 18 which is received within an opening 20 of an upright member 22. A threaded screw 24 is received within a recessed opening 26 of upright member 22 and secures member 22 to the forward end of shell 12. A heating element 28 is received within shell 12 and provides a means for heating the ironing surface 14 and an insulator 30 of asbestos or other suitable material is secured to the top of element 28 by suitable fastening means. A pair of electrical conductors 32 extend upwardly from heating element 28 through insulator 30 and partially into the opening 34 of handle 16. Opening 34 slidingly receives a rechargeable battery pack 36 which is provided with a plurality of parallel, spaced apart cooling fins 38 which extend outwardly from an aluminum covering 40 of rechargeable battery pack 36. Cooling fins 38 in combination with the aluminum covering 40 provide fast heat dissipation when iron 10 is in operation, thus protecting the rechargeable battery pack 36. A pair of spaced apart button contacts 42 slidably engage the upper ends of electrical conductors 32 thus providing a series circuit to heating element 28 by means of sliding switch 43 in the upper extremity of upright member 22. A female plug 44 in the rear of shell 12 contacts a pair of electrical conductors 46 which extend upwardly through shell 12 for a purpose which will hereinafter be described. Electrical conductors 32 and 46 are received through an insulator 47, thus preventing a short circuit during operation or recharging. The upper ends of electrical conductors 46 slidably engage a pair of spaced apart button contacts 48 of rechargeable battery pack 46 and female plug 44 provides a means for receiving a male plug 50 of cord 52 which provides a connection means to an alternating current receptacle through a male plug 54 secured to the end of cord 52.

In operation, switch 43 is placed in the on position by the user and the circuit is closed between battery pack 36 and the heating element 28, thus heating the surface 14 of shell 12 in the well known manner.

When it is desired to recharge the rechargeable battery pack 36, switch 43 is pushed to off position, and the male plug 50 of cord 52 is plugger into female plug 44 in the rear of shell 12 and the male plug 54 secured to the other end of cord 52 is received in an alternating current receptacle and when the battery pack 36 is recharged, cord 52 is removed from the receptacle and the plug 44, and iron 10 may be put into use again.

It will be noted that rechargeable battery pack 36 may be replaced by grasping and sliding it from within the opening 34 and the button contacts 42 and 48 will slidably disengage from their respective electrical conductors 42 and 46.

While various changes may be made in the detail construction it shall be understood that such changes shall be within the spirit and scope of the present invention as defined by the appended claim.

What I claim as new and desire to protect by Letters Patent of the United States is:

A cordless travel iron comprising, in combination, a hollow metallic shell, a sole plate forming a lower side of said metallic shell, a heating element carried by said shell providing a means for heating said sole plate, insulator means within said shell providing a means for directing the heat from said heating element downwardly to said sole plate, a handle carried by said shell providing handle grip means for said travel iron, a rechargeable battery pack carried by said shell providing self power for said travel iron, a plug carried by said shell providing a means for inserting an electric cord for recharging said battery pack, a slide switch providing make and break means for an electric circuit between said battery pack and said heating element, an upright member externally secured to the forward end of said shell of said travel iron by means of a threaded screw, said sliding switch being slidably received within the upper extremity of said upright member, an opening in the upper end of said upright member, said handle having a projection, said upright member slidably receiving said projection of said handle, said handle being provided with a rectangular opening in the rear for receiving said battery pack, said handle being secured to the upper surface of said shell, said rechargeable battery pack being frictionally and slidably received within said opening in said handle and being covered with an aluminum covering having a plurality of parallel, spaced apart cooling fins providing means for dissipating heat to prevent the destruction of said rechargeable battery pack, said cooling fins extending rearwardly of said shell and in combination with the rear of said shell providing support means for said travel iron when stood upon its end, a plurality of contact buttons, electrical conductors between said heating element and said plurality of contact buttons, electrical conductors between said plug and said contact buttons providing a means for recharging said rechargeable battery pack, said contact buttons, said conductors and said plug being secured within an insulator block within said shell to prevent short circuiting and said insulator means comprising a flat asbestos sheet over said sole plate and an air space above said asbestos sheet separating said asbestos sheet and the upper side of said shell.

References Cited by the Examiner
UNITED STATES PATENTS

| | | | |
|---|---|---|---|
| 1,093,791 | 4/14 | Madsen | 219—256 |
| 1,461,878 | 7/23 | Harvey | 219—251 |
| 2,540,841 | 2/51 | Stancu | 321—8 |
| 2,829,232 | 4/58 | Negromanti | 219—258 X |
| 2,920,260 | 1/60 | Goffstein | 321—8 |
| 3,079,486 | 2/63 | Winchell | 219—528 |
| 3,105,138 | 9/63 | Gazdik | 219—433 X |
| 3,120,632 | 2/64 | Hopt et al. | 320—57 X |

RICHARD M. WOOD, *Primary Examiner.*

ANTHONY BARTIS, *Examiner.*